United States Patent [19]
Berry

[11] Patent Number: 6,123,297
[45] Date of Patent: Sep. 26, 2000

[54] SEGMENTED FLAP WITH VARIABLE CAMBER FOR AIRCRAFT WING

[75] Inventor: Patrick Berry, Borensberg, Sweden

[73] Assignee: SAAB Aktiebolag, Linköping, Sweden

[21] Appl. No.: 09/180,951
[22] PCT Filed: May 20, 1997
[86] PCT No.: PCT/SE97/00828
§ 371 Date: Nov. 18, 1998
§ 102(e) Date: Nov. 18, 1998
[87] PCT Pub. No.: WO97/44238
PCT Pub. Date: Nov. 27, 1997

[30] Foreign Application Priority Data

May 22, 1996 [SE] Sweden ................................ 9601956-7

[51] Int. Cl.[7] ....................................................... B64C 3/50
[52] U.S. Cl. ............................................ 244/214; 244/217
[58] Field of Search ..................................... 244/124, 213, 244/214, 215, 217, 219

[56] References Cited

U.S. PATENT DOCUMENTS

| | | | |
|---|---|---|---|
| 2,938,680 | 5/1960 | Greene et al. | 244/214 |
| 3,704,828 | 12/1972 | Studer et al. | 244/213 X |
| 3,836,099 | 9/1974 | O'Neill et al. | |
| 4,131,253 | 12/1978 | Zapel | 244/219 |
| 4,427,168 | 1/1984 | McKinney et al. | 244/214 |
| 4,687,162 | 8/1987 | Johnson et al. | 244/213 |

FOREIGN PATENT DOCUMENTS 0 103 038 A1  3/1984  European Pat. Off. .
7703764-6  8/1983  Sweden .

*Primary Examiner*—Robert P. Swiatek
*Attorney, Agent, or Firm*—Pollock, Vande Sande & Amernick, R.L.L.P.

[57] ABSTRACT

A segmented flap having a variable curvature for an airplane wind. The flap includes segments arranged to be angularly adjustable in relation to each other and in relation to the wing and at least an articulating mechanism having a first link arm and a second link arm. The first link arm is arranged at an edge of the wing. The second link arm is rotatably attached to the first link arm by a first shaft. The first link arm is provided with an elongated first channel that extends at the side of and in a determined angle intersects an elongated second channel arranged in the second link arm. A guide rail is arranged in a direction transversal to the two channels and located in an opening defined by the channels where they intersect each other. A plurality of rods connect the angular legs that define an angle formed by the two link arms and which are rotatably attached to each other and to the link arms and which have variable lengths, so that the rods together with each other form a polygon curve, such that a displacement of the guide rail in the channels of the link arms determines the curvature of the polygon curve, whereby the curvature of the flap is determined as each rod being part of the curve is associated with a top air foil and a bottom air foil, respectively, forming the surfaces of the flap segments.

4 Claims, 6 Drawing Sheets

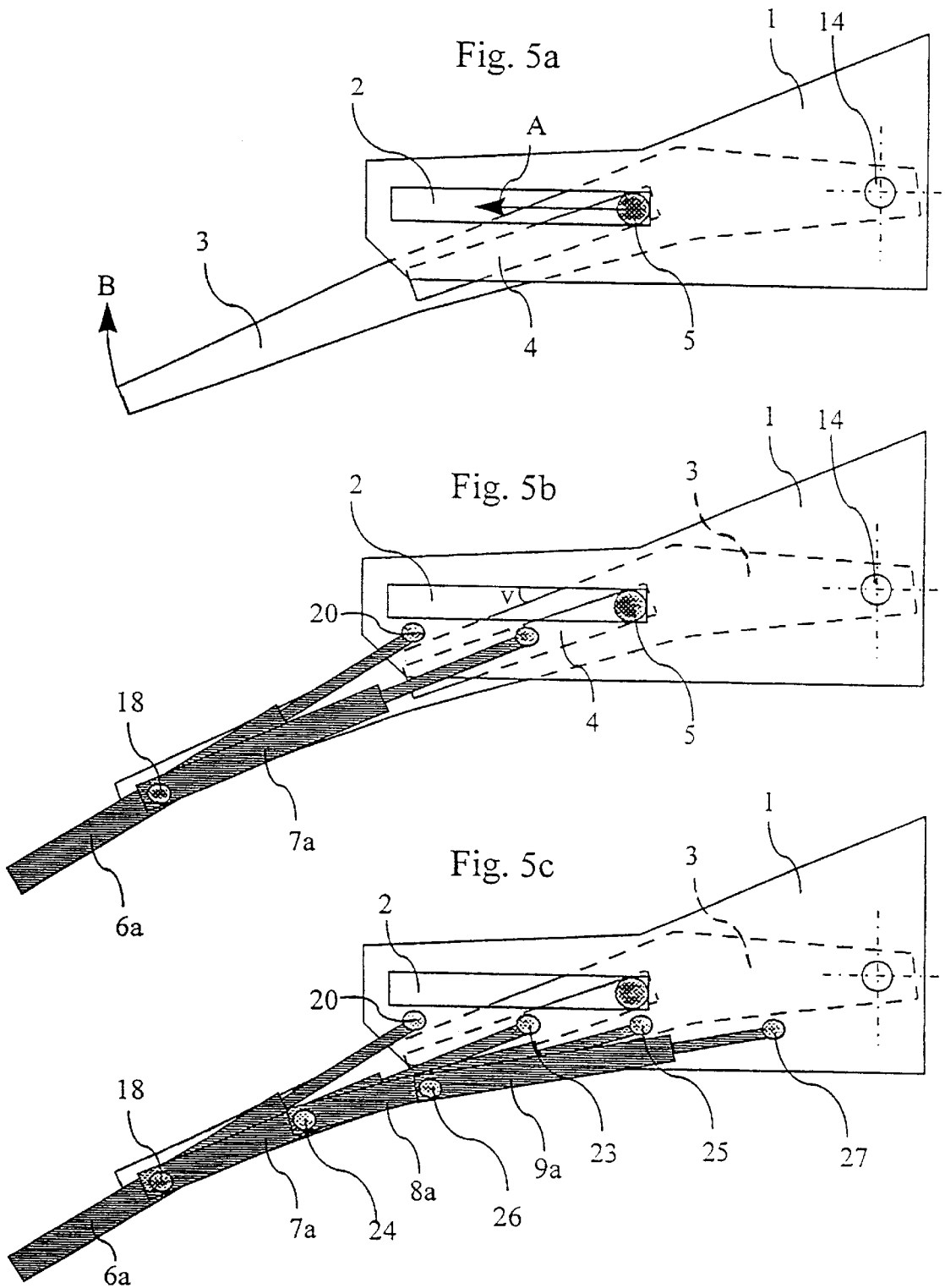

Fig. 6a
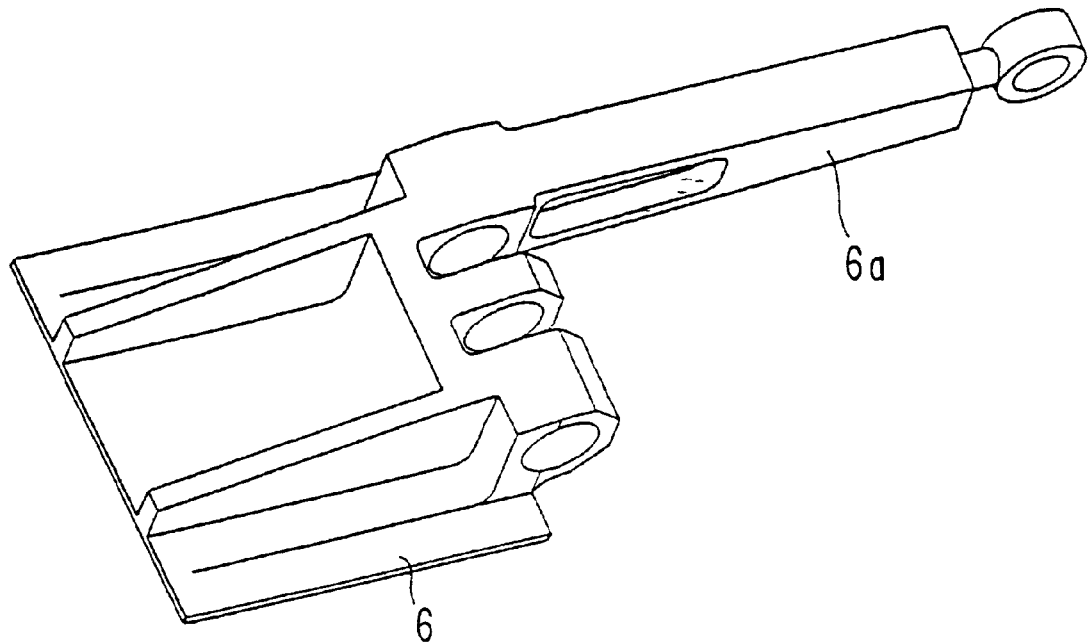
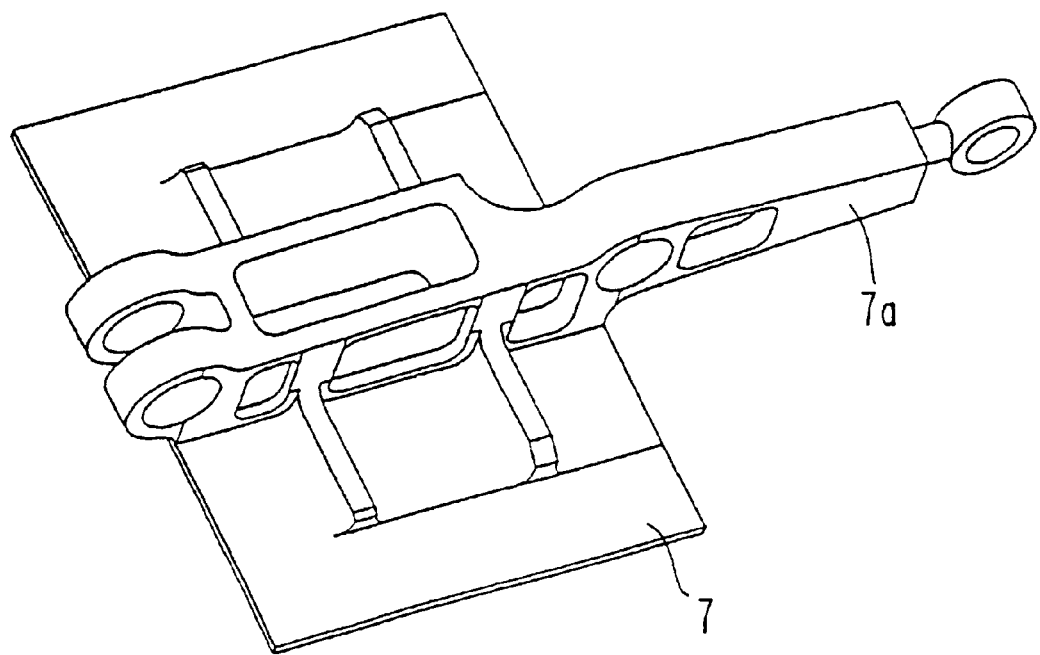
Fig. 6b

SEGMENTED FLAP WITH VARIABLE CAMBER FOR AIRCRAFT WING

TECHNICAL FIELD

The invention relates to the field of segmented flaps having variable curvatures, intended for airplane wings and preferably intended to be used as leading-edge flaps.

STATE OF THE ART

There is a need for flaps having a variable curvature for civil and military aircraft. Airplane wings provided with such flaps the shape of which can be changed are denoted MAWs, which is interpreted "Mission Adaptive Wings". A multitude of designs has been proposed in order to provide such flaps, see for example the document SE-B-7703764-6 A having the title "Anordning begränsad av profilyta med v äriabel valvning" ("A device limited by a profile surface having a variable curvature"). In said document a somewhat complicated device is described comprising links which are adjusted in relation to each other by means of rods and wedge means which are movable in the span direction.

An object of the present invention is to provide a relatively simple and light but still reliable design which allows a large freedom of adapting the curvature of the flap according to various requirements.

DESCRIPTION OF THE INVENTION

According to an aspect of the invention a wing flap for variable curvature is divided in a number of segments. These segments are arranged to be angularly adjustable in relation to each other so that the segments together form a curved or arched surface forming the flap. The angular position of the segments in relation to each other and in relation to the very wing surface is accomplished by means of at least one articulating mechanism in a direction along a substantially vertical cross section of the wing. Said articulating mechanism comprises link means, constituted both of link arms and of sliding rods having variable lengths.

Each segment of the flap is connected to a sliding rod, the top and bottom shells of the segment being rigidly attached to the top side and bottom side respectively of said sliding rod. Thus the top and bottom shells of the first sliding rod constitutes the first segment in the wing flap etc.

The articulating mechanism has at its inner portion, i.e. at a portion closest to the wing, a first link arm, a cantilever, which is attached to the wing and extends in the direction of the articulating mechanism outwards from the wing.

A second link arm is rotatably attached to the cantilever by a first shaft. Both the cantilever and the second link arm are each provided with a longitudinal channel, which in one embodiment is configured as an elongated hole. The two channels extend side by side and are located in a small angle in relation to each other. A guide rail is arranged through the channels and is located in an opening commonly formed by the two channels. When this guiding rail is moved forwards or backwards in the two channels in the longitudinal direction of the link device, the second link arm is made to rotate about the first shaft through an angle which is proportional to the displacement of the guiding rail.

A plurality of sliding rods are rotatably attached in a row to the bottom edge of the cantilever. Since at least two of said sliding rods in their other ends are rotatably attached to the cantilever and since all of the sliding rods are rotatably attached and linked to each other, each sliding rod will rotate through a larger angle about its stationary shaft on the cantilever the longer out of the cantilever it is attached, when the guiding rail is moved along said channels. Thereby the sliding rods will form a polygon curve which determines the curvature of the segments of the flap, a curvature which is dependent on the position of the guiding rail.

The curvature is allowed by the fact that the sliding rods adapt their lengths depending on the instantaneous angle between the cantilever and the second link arm. The sliding rods are automatically shortened when the wing flap is curved and are prolonged when the wing flap is made more straight.

The link arms and the sliding rods are in an articulating mechanism preferably duplicated in order to accomplish a more reliable construction as will be demonstrated according to proposed embodiments hereinafter.

An advantage associated with the segmented flap constructed according to the invention is that the curved line at the upper side of the flap has a variable length. It is a characteristic which does not exist in segmented flaps according to prior art, in which the top side of the flap is made to have a predetermined curved line which has a fixed length or if the curved line is changed the flap is equipped with flexible shells.

A further advantage associated with a segmented flap of the kind as described is that the guiding rail according to the device gives the flap an operation which to some extent is self-locking, since forces acting on the two link arms cannot without some resistance move the guiding rail in the channels of the two link arms.

The segmented flap is advantageously used as a leading-edge flap on a wing but can also, however, exist as a trailing-edge flap.

DESCRIPTION OF THE DRAWINGS

FIGS. 5a–5c show in schematic views, for the sake of clarity, the articulating mechanism with a simplified design of the links, in which FIG. 5a only shows a position of the first and second link arms together with an associated guiding rail in two elongated guide channels, FIG. 5b further the position of two of the sliding rods shown in a state in which the flap is folded down whereas FIG. 5c shows the principle of the articulating mechanism having four sliding rods forming a polygon curve.

FIGS. 6a–6d illustrate an embodiment of the invention in which the bottom air foils of the segments are shown integrated with their sliding rods associated with the respective segment in an articulating mechanism.

EMBODIMENTS

The segmented flap is described hereinafter as a number of embodiments with reference to the accompanying drawings. In the embodiment a flap having four segments is shown as an example. There is no obstacle to arranging more or less segments in the flap.

Figure 1:
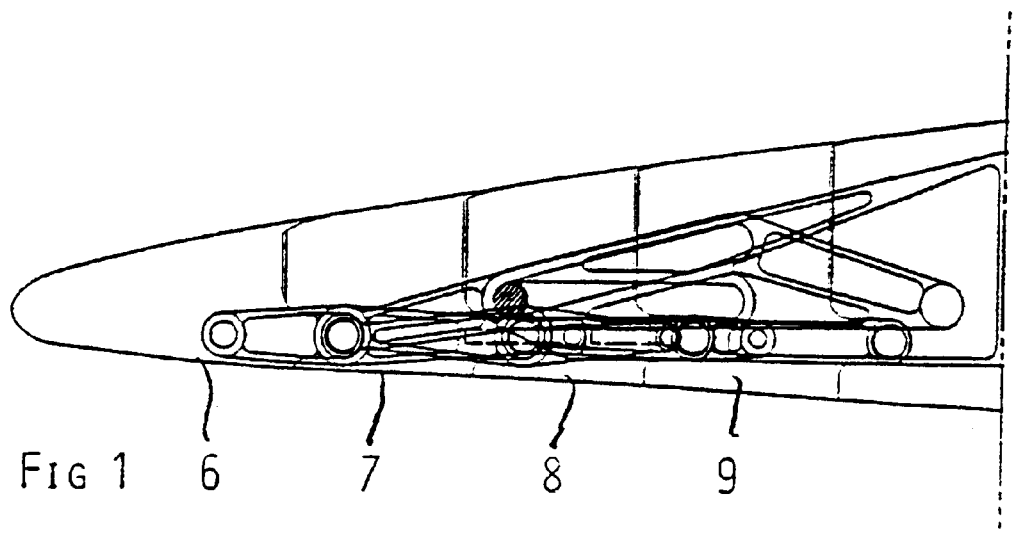
FIG. 1 shows a cross sectional view of a wing flap according to an embodiment of the invention in a non-curved state.
Figure 2:
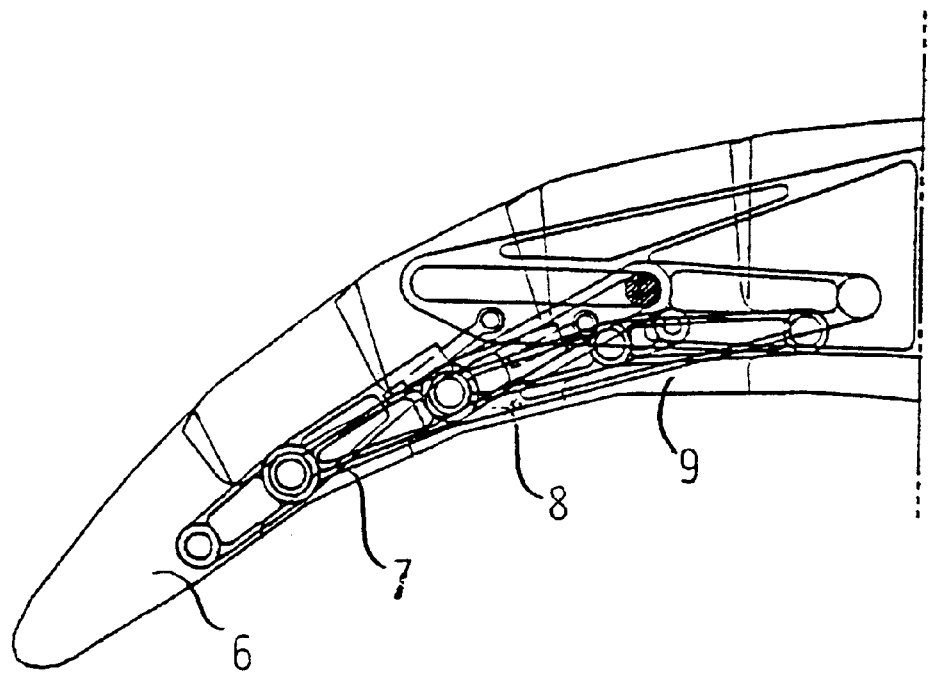
FIG. 2 shows the same flap as in FIG. 1 but in a curved state.

FIGS. 1 and 2 show a segmented flap according to the invention in a completely folded-up and folded-down state respectively. The top surfaces and the bottom surfaces of the different segments 6–9 are shown by the outline of the segments as well as by the location of an articulating mechanism in relation to the outlines of the respective segments.

Figure 3:
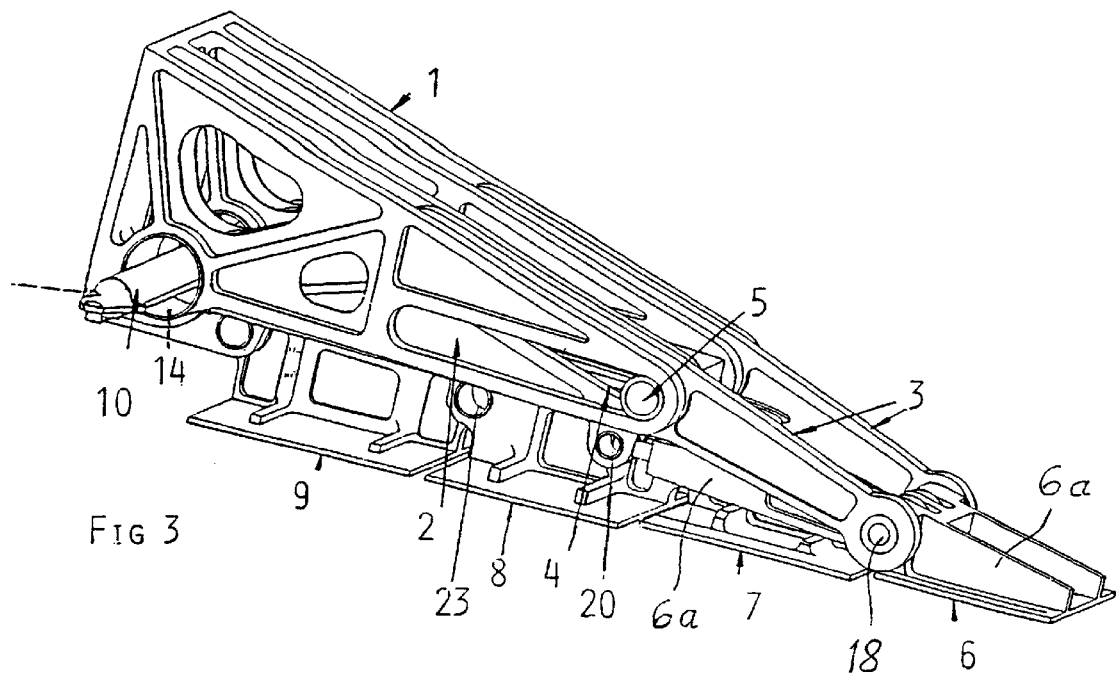
FIG. 3 shows in a perspective view the articulating mechanism of a segmented flap where the top and bottom shells are removed.
Figure 4:
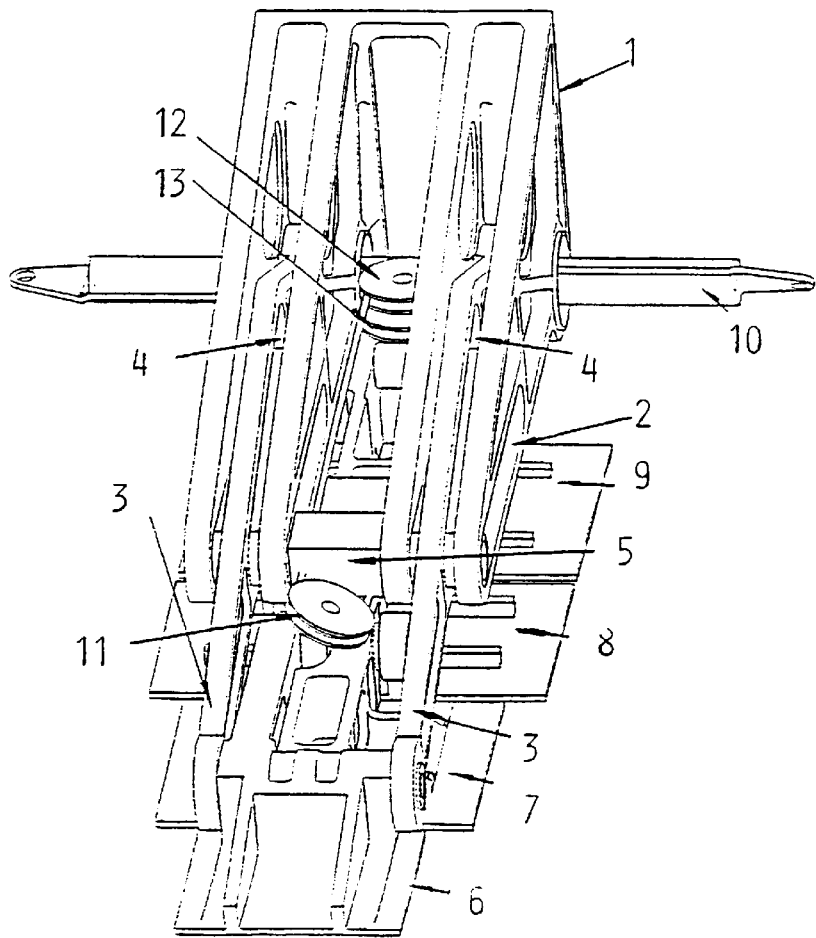
FIG. 4 shows the articulating mechanism according to FIG. 3 but as seen from another point of view.
Figure 6C:
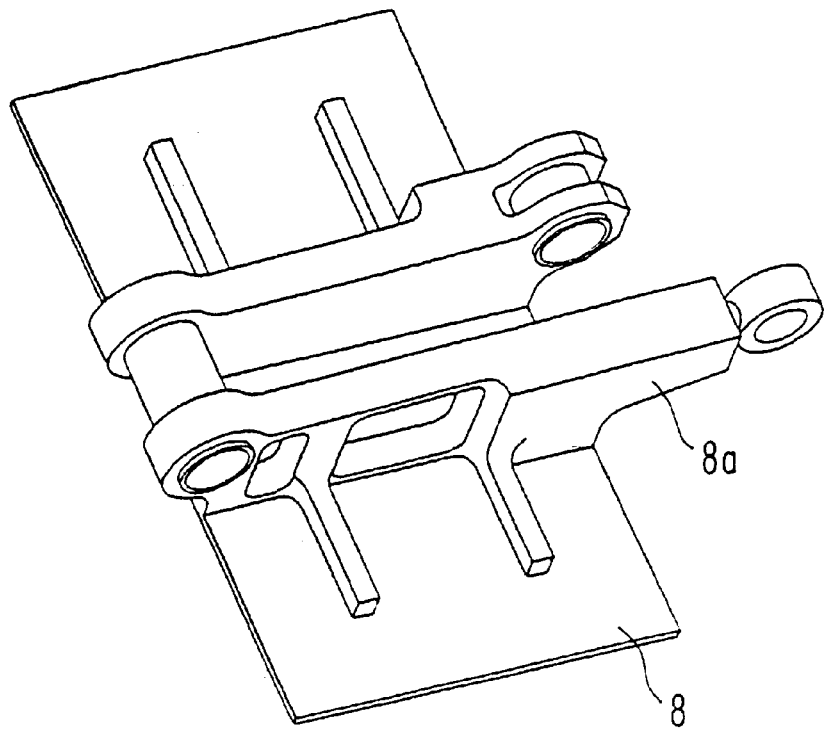
Figure 6D:
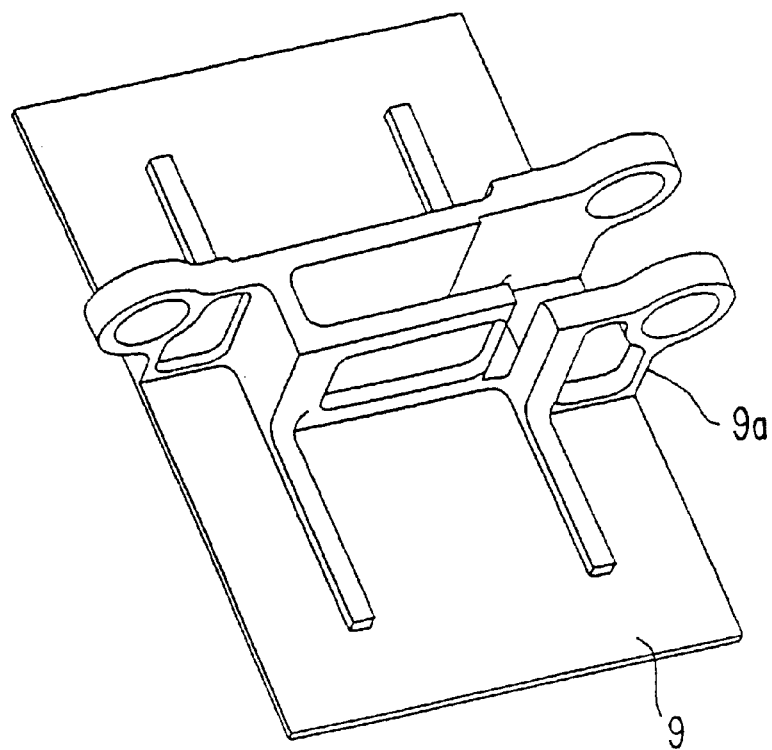

The construction of the segment and the movable parts of the flap are illustrated in FIGS. 3 and 4, in which, among the air foils of the segments 6–9, only the air foils at the bottom are visible. Articulating mechanisms, by means of which the segments of the flap are operated, are arranged in a necessary number along the flap. Since it is difficult to read or deduce the function of the articulating mechanism of the flap from FIGS. 1–4, we will now turn to a description of the mutual relation and linking of the different elements with each other in conjunction with FIGS. 5a–5c, which illustrate a principle construction having the function of the articulating mechanism. The articulating mechanism consists of a number of links which are rotatable in a plane, substantially vertically right through the span of the wing.

In FIG. 5a a first link arm 1 is shown, also called a cantilever, since this cantilever is at its rear edge attached to an edge of a wing. The first link arm 1 is in its longitudinal direction provided with an elongated first channel 2, which in the example is shown as an elongated hole. In a plane parallel to the plane through the first link arm extends a second link arm 3, which is rotatably movable in the plane of the articulating mechanism and is rotatably attached to the cantilever 1 by means of a first shaft 14. The second link arm which has an extension located at some angle in the bending direction of the flap is also provided with a channel, a second channel 4, here shown as an elongated hole, having substantially the same dimensions as the first channel. Since the second link arm is located at an angle in relation to the longitudinal direction of the cantilever, the second channel 4 extends at the side of the first channel 2 but at an angle v in relation to the first channel 2.

In an opening, which is commonly formed by the two channels 2, 4, where these channels intersect each other, is a guide rail 5 arranged perpendicularly to the rotation plane of the articulating mechanism. This guide rail 4 can be moved forwards or backwards in a direction which is defined by the first channel 2 of the cantilever and is illustrated by the arrow A in FIG. 5a. If said guide rail 5 is moved in the direction of the arrow A, the link arm 3 is thereby forced to adopt a more folded-up position, as indicated by the arrow B in FIG. 5a, thereby straightening the articulating mechanism. A movement forwards and backwards of the guide rail 5 thus results in a straightening or a bending respectively of the cantilever 1 and the second link arm 3 in relation to each other.

Between the outermost portion of the link arm 3 and the cantilever 1 a number of sliding rods 6a–9a are arranged. These sliding rods 6a–9a each consist according to the described example of two parts, a first rod part having at its one end a guide bore, in which a second rod part runs and is guided. By this dividing of each sliding rod in two rod parts, the sliding rods 6a–9a are given a variable length, which is necessary according to the construction, since the sliding rods must be capable of adapting their lengths since they connect the cantilever and the second link arm.

A first sliding rod 6a is with its first rod part rotatably attached to a second shaft 18 at the outermost portion of the rotatable second link arm 3. The second shaft 18 is parallel to the first shaft 14 of the articulating mechanism. The first sliding rod extends outwards beyond the outermost portion of the second link arm 3. Further, the first sliding rod 6a is with its second rod part rotatably attached by a third shaft 20 to the outermost position of the cantilever 1 as seen from the edge of the wing. In a similar way a second sliding rod 7a is with its one end rotatably attached to the second shaft 18 and with its second end rotatably attached by a fourth shaft 23, which is located on the cantilever 1 at a place, located some distance closer to the rear edge of the cantilever 1 than the rotatable attachment of the first sliding rod 6a, to the cantilever. In the corresponding way a third sliding rod 8a is with its one end rotatably attached by a fifth shaft 25, located at the second sliding rod 7a, and with its second end rotatably attached by a sixth shaft 24 to the cantilever 1 which sixth shaft is located further away towards the rear edge than the rotatable attachment of the second sliding rod to the cantilever 1. In a further corresponding way a fourth sliding rod 9a can be rotatably attached by means of a seventh shaft 26 to the third sliding rod 8a and rotatably attached with its second end to the cantilever further closer to the rear edge than the second sliding rod 8a by means of an eighth shaft 27. More than four sliding rods can naturally be arranged in the corresponding way if desired. All said shafts, by means of which the sliding rods are attached, are parallel to the first shaft 14. Thereby, for a bending of the link arm 3 produced by moving the guide rail 5 to the right hand side in FIG. 5b, the sliding rods 6a–9a from the first to the last one thereof will adopt angular positions in relation to the cantilever 1 having successively decreasing angles. Thereby the sliding rods 6a–9a form a polygon curve, according to FIG. 5c, which is the more curved the more the second link arm 3 is bent in relation to the cantilever 1.

The different segments 6–9 of the wing flap are connected to the sliding rods 6a–9a, so that the respective segments 6–9 adopt substantially the same angular positions in relation to the cantilever 1 as the described sliding rods 6a–9a. This is arranged by the fact that the sliding rods are associated with top and bottom air foils or shells which define the outlines of the flap segment.

In a practical embodiment illustrated in FIGS. 6a–6d the bottom air foil of the respective flap segment is integral with the first rod part of the respective sliding rod 6a–9a. FIGS. 6a–6d also provide a picture how the links and the rotatable attachments of the different sliding rods can be arranged.

An airplane wing having a segmented flap of the kind described has a plurality of segments, usually at least three. The top portions of the flap as well as its bottom portions are, as appears from the description, divided in portions associated with the respective segments. When the curvature of the flap is changed, it is required that the longitudinal directions of the air foils, as taken right through the span direction, can be changed in the corresponding way, which in the embodiment is achieved by having the air foil of a segment located in front cover a front marginal portion of the air foil or shell of a segment located at the rear side. In the invention at least the top air foil of the flap is arranged in this way.

As appears from FIGS. 3 and 4 both the cantilever 1 and the second link arm 3 are duplicated so that the arms acting in parallel in the articulating mechanism of the cantilever 1 and the second link arm 2 provide a stability to the construction.

The displacement of the guide rail 5 is accomplished by means of a pushrod 10 which is movable in a direction transversal to the articulating mechanism and which cooperates with pulley means 11–13 and wire means, which transfer movement of the push rod 10 to the guide rail 5.

Figure 7:
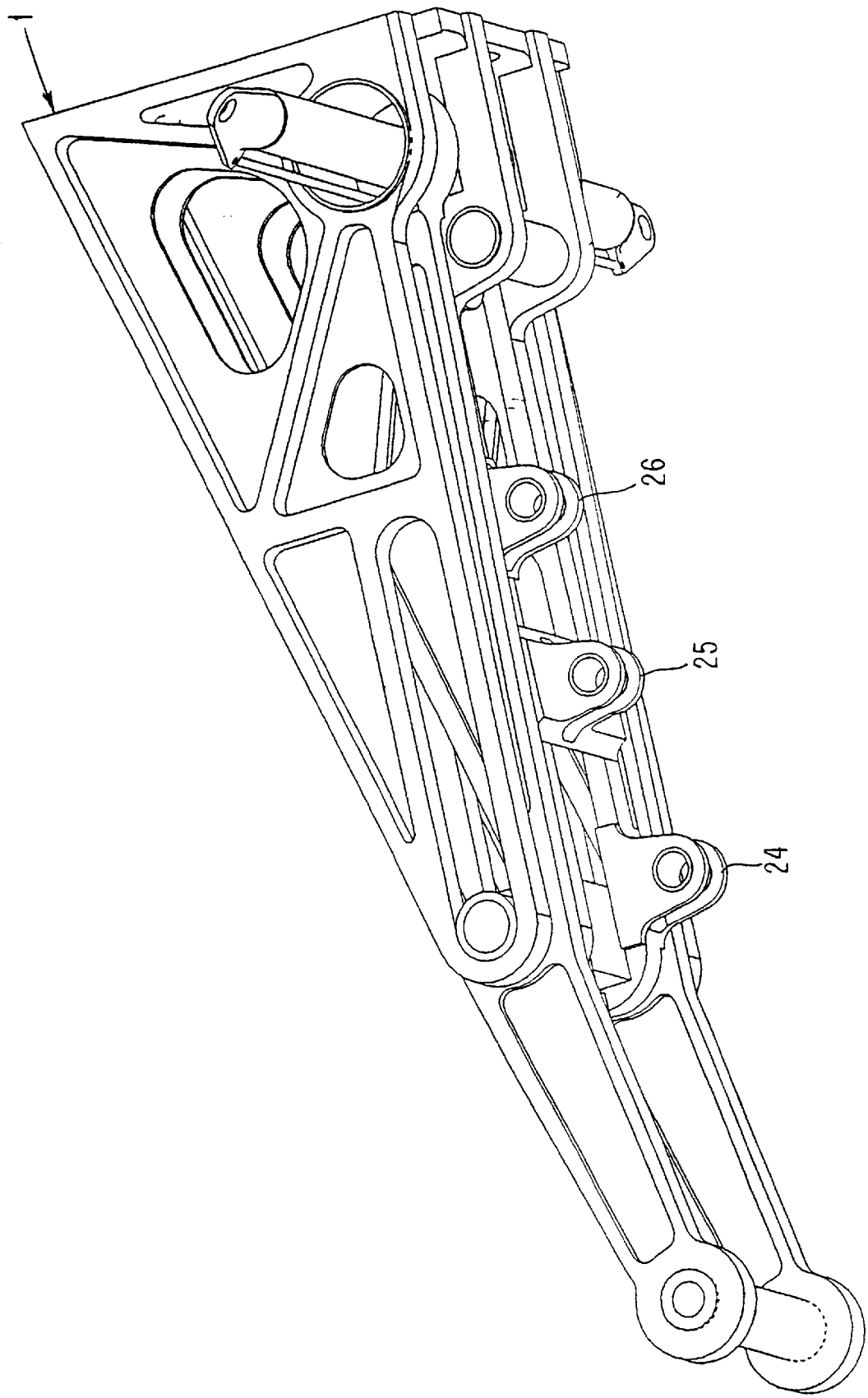
FIG. 7 shows in a view from the underside of the articulating mechanism the configuration of the link arms together with their holes for the rotatable attachments.

In FIG. 7 the articulating mechanism is illustrated in a view from the bottom side thereof. There clearly, on the cantilever 1, the points of rotatable attachments 24, 25, 26 for the shafts are visible, to which the sliding rods 6a–9a are attached, the attachments having the shape of eyes for receiving said shafts.

What is claimed is:

1. A segmented flap having a variable curvature for an airplane wing, the flap comprising segments (6–9) arranged to be angularly adjustable in relation to each other and in relation to the wing and at least an articulating mechanism having a first link arm (1) and a second link arm (3), characterized in that the first link arm (1) for arrangement at an edge of the wing, the second link arm (3) is rotatably attached to the first link arm (1) by means of a first shaft (14), the first link arm (1) is provided with an elongated first channel (2) which extends at the side of and in a determined angle intersects an elongated second channel (4), arranged in the second link arm (3), a guide rail (5) is arranged in a direction transversal to the two channels (2, 4) and located in an opening defined by the channels (2, 4) where they intersect each other, a plurality of rods (6a, 7a, 8a, 9a) connect the angular legs that define an angle formed by the two link arms (1, 3) and which are rotatably attached to each other and to the link arms and which have variable lengths, so that the rods together with each other form a polygon curve, such that a displacement of the guide rail (5) in the channels (2, 4) of the link arms (1, 3) determines the curvature of said polygon curve, whereby the curvature of the flap is determined as each rod (6a–9a) being part of the curve is associated with a top air foil and a bottom air foil respectively forming the surfaces of said flap segments.

2. A flap according to claim 1, characterized in that the bottom air foil of a segment (6–9) is integral with the rod (6a–9a) associated with the segment.

3. A flap according to claim 1, characterized in that at least the top air foils of the segments, when folding the flap upwards, at the connection of the segment to an adjacent segment, the front edge of the air foil of a segment located at the rear side is displaced inwards, below the rear edge of the air foil of a segment located in front, whereby an unbroken surface of the flap is obtained.

4. A flap according to claim 1, characterized in that the curvature of the flap is operated by a push rod (10) through pulley means (11–13) and wire means, which transfer a displacement of the push rod (10) to the guide rail (5).

* * * * *